June 7, 1927.
E. C. LE MUNYON ET AL
1,631,540
BRAKE
Original Filed Dec. 8, 1921
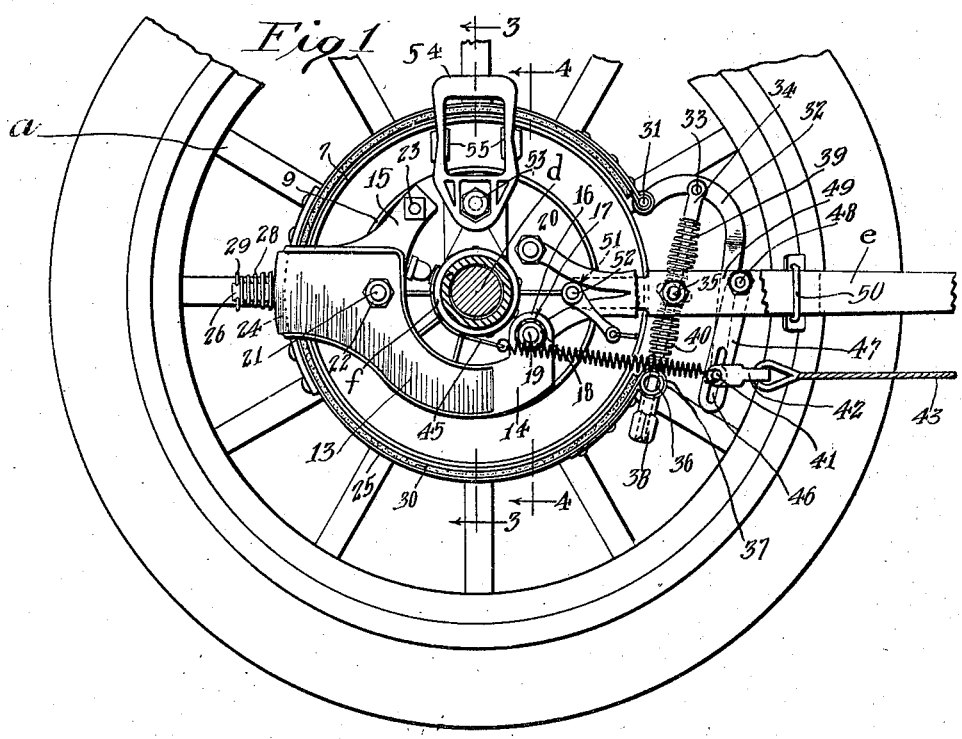
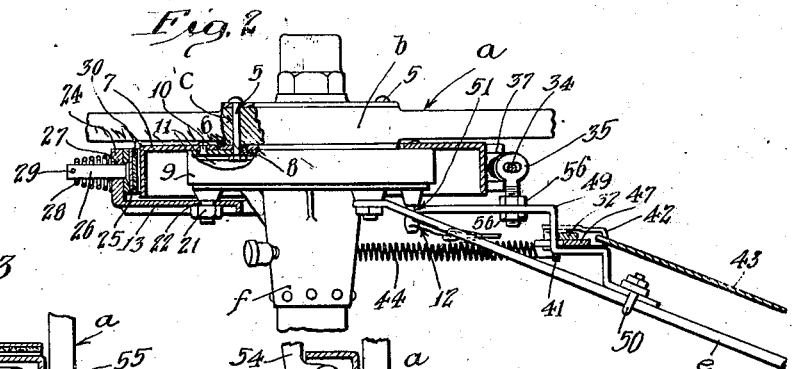
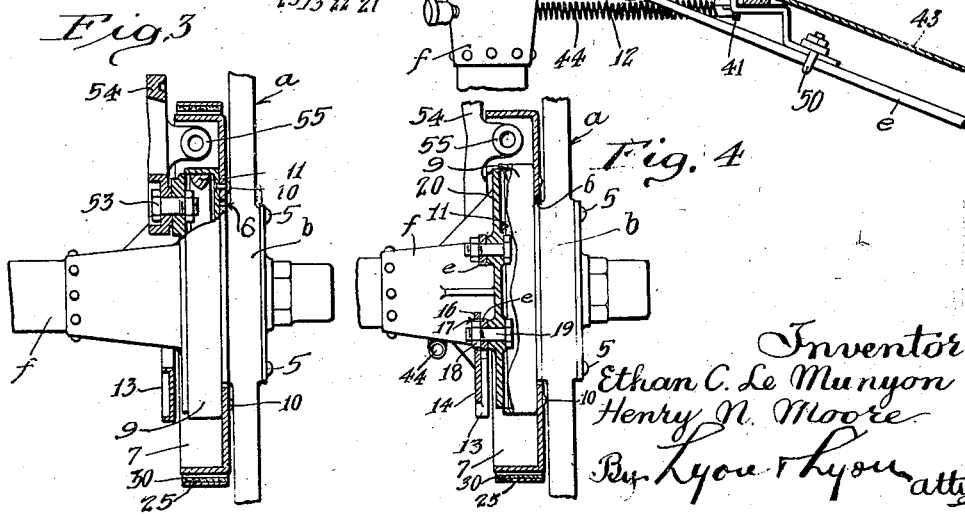
Inventors
Ethan C. Le Munyon
Henry N. Moore
By Lyon & Lyon attys Patented June 7, 1927.

1,631,540

UNITED STATES PATENT OFFICE.

ETHAN C. LE MUNYON AND HENRY N. MOORE, OF LOS ANGELES, CALIFORNIA, ASSIGNORS, BY MESNE ASSIGNMENTS, TO ROCKY MOUNTAIN STEEL PRODUCTS, INC., OF LOS ANGELES, CALIFORNIA, A CORPORATION OF CALIFORNIA.

BRAKE.

Application filed December 8, 1921, Serial No. 521,073. Renewed November 5, 1926.

This invention relates to brakes of the character used on motor vehicles, and an object of the invention is to provide a simple and efficient brake that can be readily attached to a well known standard small type of motor vehicle.

Another object is to provide for efficient cooling of the brake drum.

Another object is to so construct the brake as to permit the use of shock absorbers, and at the same time keep the connection of the spring with the shock absorber at a relatively low point so as to minimize side sway.

Another object is to provide an effective device to prevent the brake band from being pulled laterally, thus avoiding twisting of the band and consequent decrease of braking friction.

Another object is to provide a brake which can be installed on a well known type of motor vehicle without disturbing or interfering with the operation of any of the ordinary emergency brake parts.

Another object is to insure continuous alinement of the brake band with the drum so as to prevent the band from rubbing against the wheel spokes.

The accompanying drawings illustrate the invention.

Fig. 1 is an elevation looking at the inner face of a brake constructed in accordance with the provisions of this invention and connected with a wheel which is fragmentarily shown. The axle on which the wheel is mounted and the housing for said axle are shown in section.

Fig. 2 is a fragmental plan view of Fig. 1, portions of the brake and wheel hub being shown in section.

Figs. 3 and 4 are elevations mainly in section on lines indicated by 3—3, 4—4, respectively, Fig. 1, portions of the wheel being broken away to contract the views.

A vehicle wheel is indicated at $a$, the hub $b$ thereof being provided with the usual brake-drum-fastening bolt holes $c$ in which are inserted bolts 5. The bolts 5 pass through a central opening 6 in the end plate of a brake drum 7 of comparatively large diameter. The bolts 5 also pass through holes 8 in the end plate of a smaller brake drum 9. This brake drum 9 may be the one originally furnished with the motor car, or one of the same size to take the place of the original one when this brake is installed on the car. For commercial reasons it is preferable to secure the drum 9 to the drum 7 at the factory, when the brake is made, to enable the brake to be installed without a riveting or welding operation, by the purchaser thereof such as would otherwise be necessary. The rivets for securing the drum 9 to the drum 7 are indicated at 10. The usual internal brake shoe for the drum 9 is indicated at 11 and the mechanism for operating it at 12. The mechanism 12 need not be described in detail herein, since the construction and operation thereof are well understood in this art.

One of the important features of the invention is a bracket indicated in its entirety at 13. This bracket is forked so as to extend part way around the axle $d$ on which the wheel is mounted, the arms of the fork being indicated at 14, 15, respectively. The lower arm 14 is quadrant shaped and extends beneath the axle $d$ and is provided at its end with an upwardly extending ear 16 having therein a round hole 17 adapted to accommodate the hexagon nut 18 of one of the bolts 19, by which the usual radius rod $e$ is connected with the usual housing flange 20, that, of course, is stationary. It is to be noted that the hole 17 permits the bracket 13 to be assembled without disturbing the bolt 19 or its nut, the hole being sufficiently large to easily accommodate the nut, and at the same time the nut aids in preventing rotation of the bracket about the axle. Mounted in the flange 20 is a bolt 21, which, in the usual way, secures the inner brake shoe 11 at one side to the flange 20, as is well understood in this art. This bolt 21 passes through a hole 22 in the bracket 13 to thus aid in securing the bracket to the flange. If deemed necessary, the arm 15 may be secured by an additional bolt 23 to the flange 20, as clearly shown in Fig. 1. When this additional bolt is used, it is necessary to drill the hole therefor in the flange, and this is the only hole that need be drilled for assembling of the brake on the motor car.

The bracket 13 is provided with a flange 24 extending parallel with and spaced from the peripheral face of the brake drum 7. Partly surrounding the brake drum 7 is a brake band or outer shoe 25 of the usual construction carrying a pin 26 which passes through a hole 27 in the flange 24. Surrounding the outer projecting portion of the pin 26 is a coil spring 28 retained in place under compression by a pin 29 fixed transversely in the pin 26. The spring 28 thus tends to hold the brake band 25 retracted so that it will not drag upon the brake drum when the brake is "off." The brake band 25 is faced with suitable brake lining 30.

One end of the brake band 25 is pivoted at 31 to a lever 32 fulcrumed at 33 to a rod 34. The rod 34 passes through the eye of an eye bolt 35, and also passes through a pivot 36 journaled at 37 in the other end of the brake band 25. The rod 34 is provided with a nut 38 which bears against the journal 37 so that when properly turned it will adjustably contract the brake band to compensate for wear. Between the eye bolt 35 and the lever 32 is a coil spring 39 surrounding the rod 34, and another coil spring 40 surrounds said rod between the eye bolt and the journal 37. These are equalizing springs and their construction and operation are not new and are well understood in this art.

The parts just described constitute the mechanism for contracting the brake band 25 upon the drum 7, and the operation is well understood in this art and therefore need not be described in detail. The free end of the lever 32 is provided with a pivot 41 which passes through a clevis 42 joining the pivot 41 to an operating cable 43. Connected with the pivot 41 is one end of a spring 44 that is connected at its other end by a flexible member 45 to the shaft housing $f$. The spring 44 serves the usual purpose of retracting the lever 32 to throw the brake off when the cable 43 is slack.

The pivot 41 also passes through a slot 46 in an arm 47 which is pivoted at 48 to a bracket 49. The bracket 49 is secured at its forward end by a U-bolt 50 to the radius rod $e$. The rear end of the bracket 49 is forked at 51 to fit the periphery of a pivot 52 of the brake operating mechanism 12. Of course the operating cable 43 extends aslant forwardly and inwardly to an operating pedal, not shown, therefore when the cable 43 is pulled it produces a lateral pull on the lever 32 tending to throw the upper end of the brake band 25 toward the wheel. It is to prevent this that the arm 47 is provided, said arm taking the side thrust, since it is relatively short, much better than the lever 32 and, in fact, acting as a brace for said lever so as to cause the lever 32 to operate exactly in alinement with the brake band 25, when said lever is moved to contract the brake band. The eye bolt 35 is secured by nuts 56 to the bracket 49.

The cross spring, not shown, of the car may be connected by any of the usual shackle means to the flange 20, the bolt for accomplishing this being indicated at 53 and mounted in the flange 20. In order to provide for interposing a shock absorber, of any of the ordinary types at present employed, between the flange 20 and the cross spring of the car, there is secured by the bolt 53 to said flange a bracket 54 having outwardly extending ears 55 to receive the pivot of the shock absorber, not shown. These ears 55 are disposed between the inner drum 9 and the outer drum 7 so as to not interfere with the brake band of either drum. By thus inserting the ears 55 between the two drums, the point of attachment of the shock absorber with the bracket 54 is kept comparatively low relative to the axle, thus minimizing side sway of the body. As is well known, side sway contributes to overturning of the motor vehicle and is therefore to be avoided as much as possible.

The brake drum 7, as is clearly shown in the drawings, is open at its inner face to the air so that the air can freely circulate within said drum to carry away the heat absorbed by the drum when the brake is in operation. This prevents the heat from being transmitted to the hub and spokes of the wheel and thus minimizes drying out thereof by the heat and with resulting looseness of the spokes.

To install the brake described above, the wheel $a$ will be removed from the axle in the usual way thus removing with it the usual comparatively small brake drum, corresponding in function to the brake drum 9. Then the bolts $c$ securing said original drum to the wheel will be removed and the original drum will be separated from the wheel and the assembled drums 7 and 9 will be substituted for the drum thus removed. Then the bracket 49 will be mounted in place on the radius rod $e$. The next step is to bolt the bracket 13 with the parts attached thereto, to the flange 20, thus bringing the brake band 25 into concentric relation with the internal brake band 11.

Then the wheel with the two drums secured thereto will be returned to position on the axle so as to bring the drum 9 outside of the brake band 11 and the drum 7 within the brake band 25. It will be seen from this description of the assembling of the brake, that such assembling does not require the services of a skilled mechanic, and that the only machine operation required is the drilling of the hole for the bolt 23.

We claim:

1. In a brake, the combination with a vehicle wheel and an axle housing having a flange, of a brake drum fitting loosely over the flange, a second brake drum of substantially greater diameter than the first drum open to the air at its inner face and riveted to the first drum independently of the wheel, bolts passing through both drums and through the wheel, a bracket mounted on the inner face of the flange and bridging across a portion of the space between the flange and the periphery of the second drum and provided with a flange extending parallel with said periphery, a brake shoe yieldingly mounted on the second flange and partly surrounding the second drum, and means to control the brake shoe.

2. In a brake, the combination with an axle housing having a flange, of a bracket mounted on the flange, concentric drums, brake shoes for each of the drums, one of the shoes being mounted on the flange and the other shoe being mounted on the bracket, means to contract and expand each of the brake shoes, and a second bracket mounted on the flange and having ears extending into the space between the drums to receive the pivot of a shock absorber.

3. In a brake, the combination with a vehicle wheel and an axle housing having a flange, of a brake drum fitting loosely over the flange and secured to the wheel, a second brake drum of substantially greater diameter than the first drum open to the air at its inner face and secured to the first drum, a bracket mounted on the inner face of the flange and bridging across a portion of the space between the flange and the periphery of the second drum and provided with a flange extending parallel with said periphery, a brake shoe yieldingly mounted on the second flange and partly surrounding the second drum, means to contract the brake shoe, and a second bracket bolted to the first flange and projecting upwardly therefrom and having laterally extending ears projecting into the space between the drums and constructed to receive the pivot of a shock absorber.

4. In a brake, the combination with an axle housing having a flange and a radius rod connected with said flange, of a bracket mounted on the radius rod, a brake drum, a second bracket mounted on the flange, a brake band secured intermediate of its ends to the second bracket, a lever pivotally connected with the first bracket and pivotally connected to the ends of the brake band, an arm pivoted at one end to the first bracket and shiftably pivoted at its opposite end to the free end of the lever, and operating means for the lever.

Signed at Los Angeles, California, this 1st day of December, 1921.

ETHAN C. LE MUNYON.
HENRY N. MOORE.